(12) United States Patent
Asano et al.

(10) Patent No.: US 10,707,510 B2
(45) Date of Patent: Jul. 7, 2020

(54) MEMBRANE ELECTRODE ASSEMBLY

(71) Applicant: HONDA MOTOR CO., LTD., Minato-ku, Tokyo (JP)

(72) Inventors: Yoichi Asano, Wako (JP); Takuma Yamawaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 125 days.

(21) Appl. No.: 15/919,278

(22) Filed: Mar. 13, 2018

(65) Prior Publication Data
US 2018/0269508 A1  Sep. 20, 2018

(30) Foreign Application Priority Data

Mar. 17, 2017 (JP) ................. 2017-052330

(51) Int. Cl.
| | | |
|---|---|---|
| *H01M 8/10* | (2016.01) | |
| *H01M 4/86* | (2006.01) | |
| *H01M 4/92* | (2006.01) | |
| *H01M 8/02* | (2016.01) | |
| *H01M 8/04* | (2016.01) | |
| *H01M 8/1004* | (2016.01) | |
| *H01M 8/1039* | (2016.01) | |
| *H01M 8/0234* | (2016.01) | |
| *H01M 8/04119* | (2016.01) | |
| *H01M 8/0239* | (2016.01) | |
| *H01M 8/1018* | (2016.01) | |

(52) U.S. Cl.
CPC ....... *H01M 8/1004* (2013.01); *H01M 4/8626* (2013.01); *H01M 4/926* (2013.01); *H01M 8/0234* (2013.01); *H01M 8/0239* (2013.01); *H01M 8/04171* (2013.01); *H01M 8/1039* (2013.01); *H01M 2004/8684* (2013.01); *H01M 2004/8689* (2013.01); *H01M 2008/1095* (2013.01); *H01M 2300/0082* (2013.01)

(58) Field of Classification Search
None
See application file for complete search history.

(56) References Cited

U.S. PATENT DOCUMENTS

| | | | | |
|---|---|---|---|---|
| 7,745,037 | B2 * | 6/2010 | Matsuo | ............... H01M 4/881 429/524 |
| 2013/0260279 | A1 * | 10/2013 | Fuller | ................... C08J 5/2237 429/482 |
| 2014/0295315 | A1 * | 10/2014 | Fukumizu | .......... H01M 8/1004 429/481 |

FOREIGN PATENT DOCUMENTS

| | | |
|---|---|---|
| JP | 2011-243314 | 12/2011 |
| JP | 2014-209441 | 11/2014 |

* cited by examiner

*Primary Examiner* — Barbara L Gilliam
*Assistant Examiner* — Angela J Martin
(74) *Attorney, Agent, or Firm* — Amin, Turocy & Watson, LLP

(57) ABSTRACT

In pore diameter distribution curves of a first stack body formed by stacking a first gas diffusion layer and a first porous layer of an anode, and of a second stack body formed by stacking a second gas diffusion layer and a second porous layer of a cathode, on a region where a pore diameter is smaller than a reference pore diameter at which a pore volume is maximum, both the curves coincide with each other for the most part. On a region where the pore diameter is equal to or larger than the reference pore diameter, the distribution curve of the second stack body lies above that of the first stack body. A pore volume ratio which is a ratio of the total pore volume of the second stack body to the total pore volume of the first stack body is in the range of 1.10 to 1.60.

8 Claims, 3 Drawing Sheets

MEMBRANE ELECTRODE ASSEMBLY

CROSS-REFERENCE TO RELATED APPLICATION

This application is based upon and claims the benefit of priority from Japanese Patent Application No. 2017-052330 filed on Mar. 17, 2017, the contents of which are incorporated herein by reference.

BACKGROUND OF THE INVENTION

Field of the Invention

The present invention relates to a membrane electrode assembly including an anode, a cathode, and a solid polymer electrolyte membrane interposed between the anode and the cathode.

Description of the Related Art

A membrane electrode assembly of a solid polymer electrolyte fuel cell includes an anode, a cathode, and an electrolyte membrane interposed between the anode and the cathode. The electrolyte membrane is made of sulfone group-containing resin. The anode faces one surface of the electrolyte membrane, and the cathode faces the other surface of the electrolyte membrane. Each of the anode and the cathode chiefly contains metal catalyst such as platinum, platinum alloy, etc., and includes an electrode catalyst layer which contacts the electrolyte membrane to play a role of a reaction field where an electrode reaction occurs. A hydrogen-containing fuel gas is supplied to the electrode catalyst layer of the anode, and an oxygen-containing gas is supplied to the electrode catalyst layer of the cathode. At the electrode catalyst layer of the cathode, water is produced by the electrode reaction.

In order to facilitate supply of the fuel gas or the oxygen-containing gas to the electrode catalyst layer, and discharge of the produced water from the electrode catalyst layer, each of the anode and the cathode includes a gas diffusion layer. Gas can diffuse through the gas diffusion layer easily. The gas diffusion layer is made of a material having electron conductivity. Examples of such materials include a carbon paper.

The membrane electrode assembly having the above structure is sandwiched between a pair of separators to form a unit cell. In general, the fuel cell is in the form of a fuel cell stack formed by stacking a predetermined number of the unit cells.

The separators are arranged outside the gas diffusion layer, and each of the separators has a gas flow field provided on its end surface facing the gas diffusion layer. The fuel gas or the oxygen-containing gas supplied to the gas diffusion layer flows through the gas flow field. Further, the separator is an electrically conductive body which serves as an electrically conductive channel between the unit cells. That is, in the fuel cell stack, the unit cells are electrically connected in series.

When the electrolyte membrane is dried, the proton conductivity is lowered. In order to solve this problem, the fuel gas and the oxygen-containing gas are humidified and supplied to the gas diffusion layer to keep the electrolyte membrane in a humidified state. Therefore, water retention capability is required for the anode and the cathode to some extent. However, if the water retention capability is excessively high, pores of the gas diffusion layer are clogged due to water droplets, and it becomes difficult for the fuel gas or the oxygen-containing to reach the electrode catalyst layer.

In view of the above, in Japanese Laid-Open Patent Publication No. 2011-243314 and Japanese Laid-Open Patent Publication No. 2014-209441, the present applicant proposed a structure where it is possible to achieve an appropriate balance between the water retention capability and the water drainage capability.

SUMMARY OF THE INVENTION

At the cathode, when the operating temperature of the fuel cell stack is low, and the humidity of the oxygen-containing gas is high, it is difficult to discharge the produced water efficiently. In this case, so called flooding may occur. Therefore, the cathode is required to have good water drainage capability in comparison with the anode.

A main object of the present invention is to provide a membrane electrode assembly in which it is possible to achieve a suitable balance between the water retention capability and the water drainage capability in each electrode even in conditions of low temperature and high humidity.

Another object of the present invention is to provide a membrane electrode assembly which makes it possible to obtain a fuel cell exhibiting high terminal voltage.

According to an aspect of the present invention, there is provided a membrane electrode assembly including an anode, a cathode, and an electrolyte membrane interposed between the anode and the cathode, the electrolyte membrane including a solid polymer membrane, wherein the anode includes a first electrode catalyst layer facing the electrolyte membrane, a first gas diffusion layer configured to allow a fuel gas to flow through the first gas diffusion layer, and a first porous layer interposed between the first electrode catalyst layer and the first gas diffusion layer;

the cathode at least includes a second electrode catalyst layer facing the electrolyte membrane, a second gas diffusion layer configured to allow an oxygen-containing gas to flow through the second gas diffusion layer, and a second porous layer interposed between the second electrode catalyst layer and the second gas diffusion layer;

when pore diameter distribution of a first stack body containing the first gas diffusion layer and the first porous layer stacked together is compared with pore diameter distribution of a second stack body containing the second gas diffusion layer and the second porous layer stacked together, on a region where the pore diameter is smaller than a reference pore diameter at which the pore volume is maximum, the pore diameter distribution of the first stack body and the pore diameter distribution of the second stack body are substantially the same, and on a region where the pore diameter is larger than the reference pore diameter, the pore volume of the second stack body is greater than the pore volume of the first stack body at the same pore diameter; and a pore volume ratio represented by the following equation (1) is in the range of 1.10 to 1.60:

the pore volume ratio=total volume of pores having the pore diameter not less than the reference pore diameter, of the second stack body/total volume of pores having the pore diameter not less than the reference pore diameter, of the first stack body    (1).

It should be noted that "the range of the pore volume ratio 1.10 to 1.60" shows the value which is obtained by rounding off the value calculated according to the equation (1), to two decimal places.

In the structure, under both of the environment of low temperature and high humidity and the environment of high temperature and high humidity, it is possible to achieve a suitable balance between the water drainage capability and the water retention capability. Therefore, in any of the environment of low temperature and high humidity and the environment of high temperature and high humidity, it is possible to achieve a sufficient power generation performance. Specifically, even if the current density during power generation is high, the high terminal voltage is achieved.

Typically, the reference pore diameter is in the range of 0.7 to 1 µm. Specifically, for example, in the case where the reference pore diameter is 1 µm, on a region where the pore diameter is smaller than 1 µm, the pore diameter distribution curves coincide with each other for the most part, and on a region where the pore diameter is equal to or larger than 1 µm, the pore diameter distribution curve of the second stack body lies above the pore diameter distribution curve of the first stack body. Stated otherwise, the pore volume of the second stack body is large when the pore diameter is equal to or larger than the reference pore diameter.

It should be noted that the difference between the reference pore diameter in the pore diameter distribution curve of the first stack body and the reference pore diameter in the pore diameter distribution curve of the second stack body is negligibly small. Therefore, it can be considered that the reference pore diameters in these curves substantially coincide with each other.

The pore volume of the first porous layer is smaller than that of the second porous layer. Therefore, if the thickness of the first porous layer is small, it can be presumed that it may not be easy for the fuel gas to diffuse widely over the entire first stack body. In order to eliminate this concern, preferably, the thickness of the first porous layer is equal to or more than the thickness of the second porous layer. If the thickness of the second porous layer is large, there is a concern that the gas diffusion performance of the oxygen-containing gas might be lowered. However, even if the thickness of the first porous layer is large, the gas diffusion performance of the fuel gas is not lowered easily.

The cathode may further include a hydrophilic layer interposed between the second porous layer and the second electrode catalyst layer. The hydrophilic layer closes minute cracks of the second porous layer, and suppresses deformation of the electrolyte membrane. Further, the hydrophilic property of the hydrophilic layer provides the water retention capability.

The hydrophilic layer contains hydrophilic substance. Suitable examples of such substance include ionomer.

Further, preferably, the first porous layer and the second porous layer contain vapor-grown carbon fiber. The vapor-grown carbon fiber has sufficient electron conductivity and pore forming capability even though the vapor-grown carbon fiber has a low density. Therefore, it is possible to achieve reduction in the weight of the membrane electrode assembly.

In the present invention, the pore diameter distribution of the first stack body containing the first gas diffusion layer and the first porous layer of the anode and the pore diameter distribution of the second stack body containing the second gas diffusion layer and the second porous layer of the cathode are designed so as to satisfy a predetermined condition. Specifically, when the pore volumes of the first stack body and the second stack body are compared with each other, on a region where the pore diameter is smaller than the reference pore diameter at which the pore volume is maximum, the difference of the pore volume between the first stack body and the second stack body at the same pore diameter is 0.5 µL/cm² at a maximum. On a region where the pore diameter is larger than the reference pore diameter, the pore volume of the second stack body is larger than the pore volume of the first stack body.

In the structure, under both the environment of low temperature and high humidity and the environment of high temperature and high humidity, it is possible to achieve a suitable balance between the water drainage capability and the water retention capability. Therefore, in any of the environment of low temperature and high humidity and the environment of high temperature and high humidity, it is possible to provide a fuel cell having a sufficient power generation performance.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a membrane electrode assembly according to the present invention will be described in detail with reference the accompanying drawings.

Figure 1:
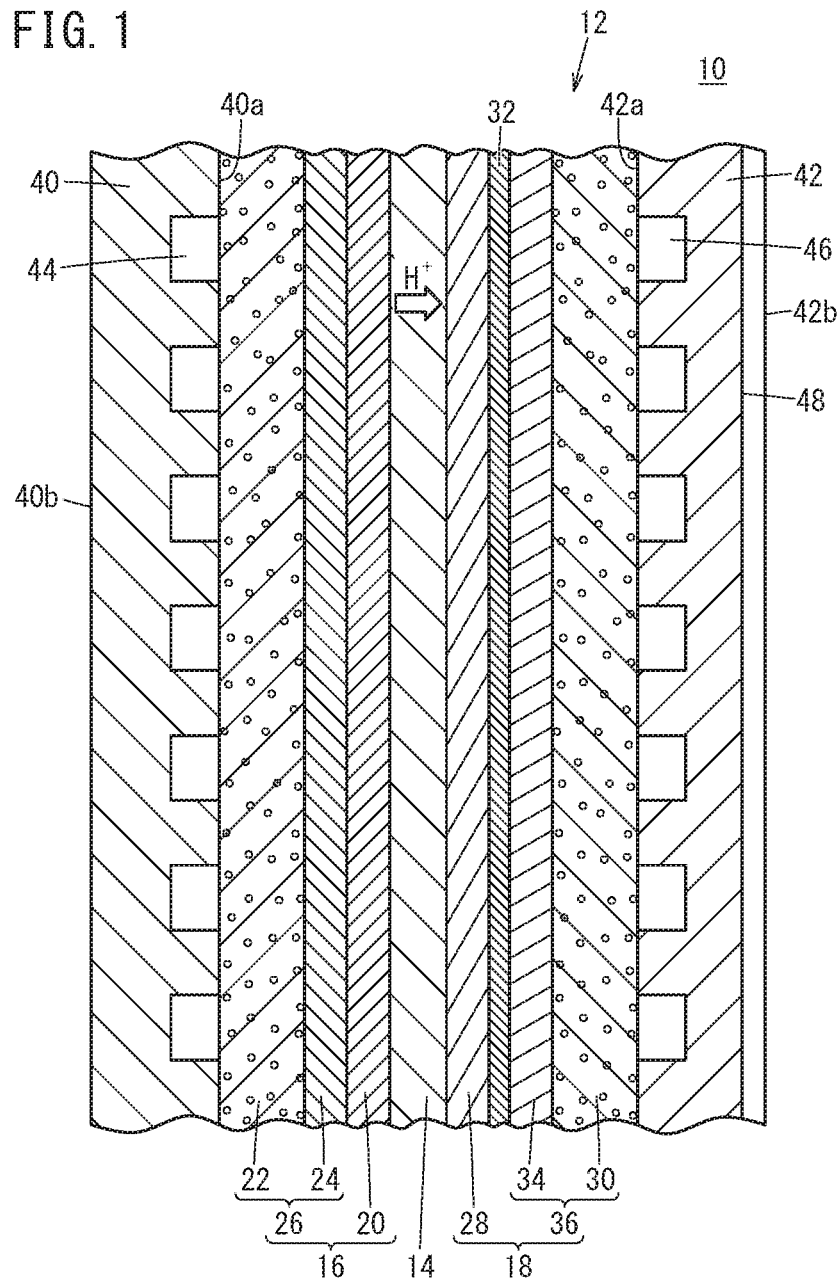
FIG. 1 is a vertical sectional view showing main components of a unit cell of a fuel cell including a membrane electrode assembly according to an embodiment of the present invention.

FIG. 1 is a vertical sectional view showing main components of a unit cell 10 of a solid polymer electrolyte fuel cell. The unit cell 10 includes a membrane electrode assembly 12 according to the embodiment of the present invention.

In the embodiment, the membrane electrode assembly 12 includes an anode 16, a cathode 18, and an electrolyte membrane 14 of cation exchange resin (solid polymer) interposed between the anode 16 and the cathode 18. Preferred specific examples of materials of the electrolyte membrane 14 include sulfonated compound of vinyl polymer such as polystyrene sulfonic acid, polymer obtained by introducing a sulfonate group or a phosphate group into heat resistant polymer such as perfluoroalkyl sulfonic acid-based polymer, perfluoroalkyl carboxylic acid-based polymer, polybenzimidazole or polyetheretherketone, polymer obtained by introducing a sulfonate group into material chiefly containing rigid polyphenylene obtained by polymerizing aromatic compound comprising a phenylene chain.

The electrolyte membrane 14 is interposed between the cathode 18 and the anode 16. The anode 16 includes a first electrode catalyst layer 20 in contact with one surface of the electrolyte membrane 14, a first gas diffusion layer 22 to which a fuel gas reaching the first electrode catalyst layer 20 is supplied, and a first porous layer 24 interposed between the first electrode catalyst layer 20 and the first gas diffusion layer 22. Of these layers, the first gas diffusion layer 22 and the first porous layer 24 form a first stack body 26.

The first electrode catalyst layer 20 includes catalyst particles where metal catalyst such as platinum, platinum alloy or the like is supported on a catalyst support such as carbon black, and an ion conductive polymer binder. Alternatively, such catalyst particles may comprise only metal catalyst particles without including any catalyst support, for example, platinum black, etc.

For example, the first gas diffusion layer 22 uses a carbon paper as the base material. The carbon paper is made of cellulosic material containing a large number of fiber carbons. The base material may be impregnated with, e.g., water repellent resin such as FEP (tetrafluoroethylene hexafluoropropylene copolymer).

The first porous layer 24 is a porous layer containing electron conductive substance and water repellent resin, and exhibits electron conductivity offered by the electron conductive substance, and exhibits water repellency offered by the water repellent resin. That is, the first porous layer 24 offers a predetermined water drainage capability.

Preferred examples of the electron conductive substance include furnace black (typically, "KETJENBLACK EC" (a trade name, and the same applies to the following) and "KETJENBLACK EC-600JD" produced by Ketjen Black International Co., Ltd., "Vulcan XC-72" produced by Cabot Corp., "TOKABLACK" produced by Tokai Carbon Co., Ltd., "Asahi AX" produced by Asahi Carbon Co., Ltd.), acetylene black (e.g., "DENKA BLACK" etc., produced by Denka Co., Ltd.), pulverized glassy carbon, carbon nanotube, etc. Particularly preferably, vapor-grown carbon fiber is used since it functions as a pore forming material for forming pores. Specific examples include "VGCF" and "VGCF-H", etc. produced by Showa Denko K.K.

Further, exemplary materials of water repellant resin include crystalline fluororesin, typically, ethylene tetrafluoroethylene copolymer (ETFE), polyvinylidene fluoride (PVDF), polyvinyl fluoride (PVF), ethylene chlorotrifluoroethylene copolymer (ECTFE), polytetrafluoroethylene (PTFE), tetrafluoroethylene perfluoroalkylvinylether copolymer (PFA), tetrafluoroethylene hexafluoropropylene copolymer (FEP), amorphous fluororesin such as "LUMIFLON" and "CYTOP" produced by Asahi Glass Co., Ltd., and silicone resin. One of these materials may be used, or two or more of these materials may be used in combination.

The cathode 18 includes a second electrode catalyst layer 28 in contact with the other surface of the electrolyte membrane 14, a second gas diffusion layer 30 to which an oxygen-containing gas reaching the second electrode catalyst layer 28 is supplied, a hydrophilic layer 32, and a second porous layer 34. The hydrophilic layer 32 and the second porous layer 34 are interposed between the second electrode catalyst layer 28 and the second gas diffusion layer 30. At the cathode 18, the second gas diffusion layer 30 and the second porous layer 34 form a second stack body 36. Further, the hydrophilic layer 32 is added thereto.

The second electrode catalyst layer 28, the second gas diffusion layer 30, the second porous layer 34 have substantially the same structure as the first electrode catalyst layer 20, the first gas diffusion layer 22, and the first porous layer 24, respectively. Therefore, the detailed description of these layers will be omitted. It should be noted that the thickness of the first electrode catalyst layer 20 may be smaller than the thickness of the second electrode catalyst layer 28, and the first electrode catalyst layer 20 and the second electrode catalyst layer 28 may have different external dimensions (surface areas). Further, each of the first electrode catalyst layer 20 and the second electrode catalyst layer 28 may comprise two or more catalyst layers having different compositions.

Further, preferably, the thickness of the second porous layer 34 is smaller than the thickness of the first porous layer 24, that is, the thickness of the first porous layer 24 is larger than the thickness of the second porous layer 34. As described later, in the embodiment of the present invention, the first stack body 26 has the smaller pore diameter. Therefore, by increasing the thickness of the first porous layer 24, it is possible to easily diffuse the fuel gas over the entire first stack body 26.

The hydrophilic layer 32 is present between the second electrode catalyst layer 28 and the second porous layer 34, and contains ionomer, which is a hydrophilic substance. Therefore, the hydrophilic layer 32 offers water retention capability. That is, the cathode 18 includes the second porous layer 34 which offers water repellency and the hydrophilic layer 32 which offers water retention capability. Specific examples of ionomer include the polymer similar to the polymer of the electrolyte membrane 14.

The hydrophilic layer 32 may further include electron conductive substance. Specific examples of the electron conductive substance of this type include those used in the first porous layer 24 and/or the second porous layer 34, e.g., vapor-grown carbon fiber.

The unit cell 10 is formed by sandwiching the membrane electrode assembly 12 having the above structure between an anode side separator 40 and a cathode side separator 42. For example, the anode side separator 40 and the cathode side separator 42 are carbon separators. Alternatively, the anode side separator 40 and the cathode side separator 42 may be made of metal such as stainless steel.

The anode side separator 40 has a fuel gas flow field 44 on its surface 40a facing the first gas diffusion layer 22. The fuel gas flow field 44 extends in a direction which is perpendicular to the plane of the paper of FIG. 1. The fuel gas flow field 44 is connected to a fuel gas supply passage (not shown) for supplying a fuel gas such as a hydrogen-containing gas to the fuel cell stack and a fuel gas discharge passage (not shown) for discharging the fuel gas from the fuel cell stack.

Likewise, the cathode side separator 42 has an oxygen-containing gas flow field 46 on its surface 42a facing the second gas diffusion layer 30. The oxygen-containing gas flow field 46 extends in the direction which is perpendicular to the plane of the paper of FIG. 1. The oxygen-containing gas flow field 46 is connected to an oxygen-containing gas supply passage (not shown) for supplying an oxygen-containing gas to the fuel cell stack and an oxygen-containing gas discharge passage (not shown) for discharging the oxygen-containing gas from the fuel cell stack. That is, the anode side separator 40 and the cathode side separator 42 are provided outside the first gas diffusion layer 22 and the second gas diffusion layer 30, respectively.

The fuel gas in the fuel gas flow field 44 and the oxygen-containing gas in the oxygen-containing gas flow field 46 flow in opposite directions. For example, in the case where the fuel gas flows from the back side toward the front side in the plane of the paper, the oxygen-containing gas flows from the front side toward the back side in the plane of the paper. In contrast, in the case where the fuel gas flows from the front side toward the back side in the plane of the paper, the oxygen-containing gas flows from the back side to the front side in the plane of the paper.

The unit cells 10 having the above structure are stacked together to form the fuel cell stack. When the unit cells 10 are stacked together, a coolant flow field 48 is formed between a surface 40b of the anode side separator 40 and a surface 42b of the cathode side separator 42 which face each other. The coolant flow field 48 is connected to a coolant supply passage for supplying a coolant to the fuel cell stack and a coolant discharge passage (not shown) for discharging the coolant from the fuel cell stack. Further, when the unit cells 10 are stacked together, the anode side separator 40 in each of the unit cells 10 and the cathode side separator 42 in the adjacent unit cell 10 are in contact with each other, and thus the unit cells 10 are electrically connected in series.

Figure 2:
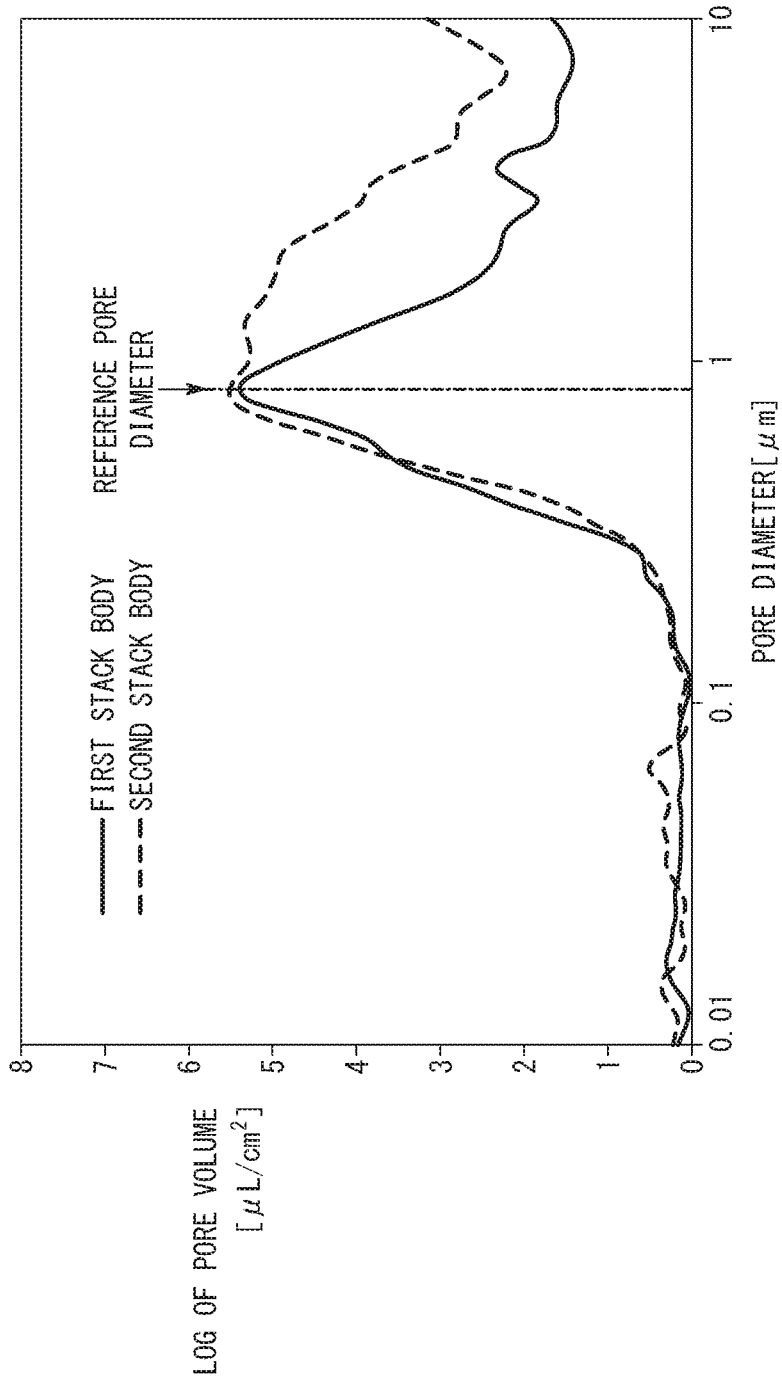
FIG. 2 is a graph showing pore diameter distribution curves of a first stack body and a second stack body of the membrane electrode assembly of FIG. 1.

Next, both of the pore diameter distribution of the first stack body 26 and the pore diameter distribution of the second stack body 36 are shown in FIG. 2. In FIG. 2, the solid line denotes a pore diameter distribution curve of the first stack body 26, and the broken line denotes a pore diameter distribution curve of the second stack body 36. It should be noted that the pore diameter distribution is determined by means of the mercury porosimetry method. Further, as described above, the first stack body 26 is formed by stacking the first gas diffusion layer 22 and the first porous layer 24, and the second stack body 36 is formed by stacking the second gas diffusion layer 30 and the second porous layer 34.

As can be seen from FIG. 2, in any of the first stack body 26 and the second stack body 36, the pores have the maximum volume when the pore diameter is 0.8 μm. Hereinafter, the pore diameter at which the pore volume is the maximum (0.8 μm in the embodiment of the present invention) is referred to as "a reference pore diameter". It can be understood that the difference between the reference pore diameter of the first stack body 26 and the reference pore diameter of the second stack body 36 is negligibly small, and the reference pore diameter of the first stack body 26 and the reference pore diameter of the second stack body 36 are substantially the same.

As can be seen from FIG. 2, on a region where the pore diameter is smaller than the reference pore diameter, the pore diameter distribution curve of the first stack body 26 and the pore diameter distribution curve of the second stack body 36 coincide with each other for the most part. Stated otherwise, on the region where the pore diameter is smaller than the reference pore diameter, the pore volume of the first stack body 26 and the pore volume of the second stack body 36 have substantially the same distribution. In this region, the difference Di between the pore volume of the first stack body 26 and the pore volume of the second stack body 36 at the same pore diameter is 0.5 μL/cm² at a maximum, and typically, equal to or less than 0.3 μL/cm².

In contrast, on a region where the pore diameter is larger than the reference pore diameter, the pore diameter distribution curve of the second stack body 36 is above the pore diameter distribution curve of the first stack body 26. That is, on the region where the pore diameter is larger than the reference pore diameter, the pore volume of the second stack body 36 is greater than the pore volume of the first stack body 26.

Further, a total pore volume ratio calculated according to the following equation (1) is in the range of 1.10 to 1.60. That is, in the embodiment of the present invention, the total pore volume of the second stack body 36 is greater than the total pore volume of the first stack body 26. This means that the second gas diffusion layer 30 and the second porous layer 34 of the cathode 18 have larger pore diameters, or larger numbers of pores in comparison with the first gas diffusion layer 22 and the first porous layer 24 of the anode 16. Stated otherwise, the second gas diffusion layer 30 and the second porous layer 34 of the cathode 18 are more porous than the first gas diffusion layer 22 and the first porous layer 24 of the anode 16.

Pore volume ratio=total volume of pores having the pore diameter not less than the reference pore diameter, of the second stack body/total volume of pores having the pore diameter not less than the reference pore diameter, of the first stack body (1)

It should be noted that "the range of the pore volume ratio 1.10 to 1.60" shows the value which is obtained by rounding off the value calculated according to the equation (1) to two decimal places.

The fuel cell stack formed by stacking the unit cells 10 each including the membrane electrode assembly 12 according to the embodiment of the present invention basically have the above structure. Next, operation and effects of the fuel cell stack will be described.

At the time of generating electricity in the fuel cell stack, an oxygen-containing gas is supplied to the oxygen-containing gas supply passage, and a fuel gas such as a hydrogen containing gas is supplied to the fuel gas supply passage. Further, a coolant such as pure water or ethylene glycol is supplied to the coolant supply passage.

The coolant supplied to the coolant supply passage flows into the coolant flow field 48 formed between the anode side separator 40 and the cathode side separator 42. The coolant flows through the coolant flow field 48, and cools the entire power generation surface of the membrane electrode assembly 12, and then, the coolant is discharged into the coolant discharge passage.

The oxygen-containing gas flows from the oxygen-containing gas supply passage into the oxygen-containing gas flow field 46 of the cathode side separator 42. The oxygen-containing gas flows through the oxygen-containing gas flow field 46. Therefore, the oxygen-containing gas moves along the cathode 18 of the membrane electrode assembly 12.

In the meanwhile, the fuel gas flows from the fuel gas supply passage into the fuel gas flow field 44 of the anode side separator 40. The fuel gas flows through the fuel gas flow field 44. Therefore, the fuel gas moves along the anode 16 of the membrane electrode assembly 12.

Thus, in the membrane electrode assembly 12, the fuel gas that has been supplied to the anode 16 and then has passed through the first gas diffusion layer 22 and the first porous layer 24, and the oxygen-containing gas that has been supplied to the cathode 18 and then has passed through the second gas diffusion layer 30, the second porous layer 34, and the hydrophilic layer 32 are consumed in the electrochemical reactions (electrode reactions) in the first electrode catalyst layer 20 and the second electrode catalyst layer 28 to thereby generate electricity.

More specifically, the fuel gas is supplied to the anode 16 through the fuel gas flow field 44. After the fuel gas passes through the first gas diffusion layer 22 and the first porous layer 24, the hydrogen gas in the fuel gas is ionized in the first electrode catalyst layer 20. As a result, protons ($H^+$) and electrons are generated. The electrons are collected as electrical energy for actuating an external load (not shown) electrically connected to the fuel cell stack. In the meanwhile, the protons reach the cathode 18 through the electrolyte membrane 14 of the membrane electrode assembly 12. The protons move from the anode 16 to the cathode 18 together with water contained in the electrolyte membrane 14.

In the second electrode catalyst layer 28 of the cathode 18, the protons, the electrons which have reached the cathode 18 after energizing the external load, and the oxygen in the oxygen-containing gas which has been supplied to the cathode 18 and passed through the second gas diffusion layer 30 and the second porous layer 34 are coupled together. As a result, water is produced. Hereinafter, the water will also be referred to as a produced water.

In the middle of the electrode reaction, in order to cause the electrolyte membrane 14 to exhibit a suitable proton conductivity, it is required to maintain the electrolyte membrane 14 in a humidified state. However, when the produced water or the like are retained in the pores of the first electrode catalyst layer 20 and the second electrode catalyst layer 28, and/or the first gas diffusion layer 22 and the second gas diffusion layer 30, flow channels for the reactant gases are clogged, and flooding occur. As a result, there is a concern that the progress of the electrode reaction may be obstructed. Therefore, at the anode 16 and the cathode 18, it is required to achieve a suitable balance between conflicting characteristics, i.e., the water retention capability for maintaining the electrolyte membrane 14 in a humidified state and the water drainage capability for diffusing the reactant gases rapidly.

In the membrane electrode assembly 12, as described above, the first porous layer 24 is interposed between the electrolyte membrane 14 and the first gas diffusion layer 22, and the second porous layer 34 is interposed between the electrolyte membrane 14 and the second gas diffusion layer 30. Further, the first stack body 26 including the first porous layer 24 and the second stack body 36 including the second porous layer 34 are designed to have the pore diameter distribution as described above.

For the reason as described above, a suitable water retention capability and a suitable water drainage capability are achieved at the anode 16 and the cathode 18. That is, in each of the anode 16 and the cathode 18, it is possible to achieve a suitable balance between the water retention capability and the water drainage capability. Therefore, even under an environment of low temperature and high humidity, it is possible to cause the electrolyte membrane 14 to exhibit an excellent proton ion conductivity. Further, it is possible to improve the performance of diffusing the reactant gases to thereby facilitate electrode reactions. Accordingly, it is possible to improve the power generation characteristics of the unit cells 10 (fuel cell stack) each having the membrane electrode assembly 12.

Further, the cathode 18 includes the hydrophilic layer 32 containing a hydrophilic substance such as ionomer. The hydrophilic layer 32 closes minute cracks of the second porous layer 34, and suppresses deformation of the electrolyte membrane 14. Therefore, it is possible to obtain an excellent power generation characteristics even at high temperature and high humidity.

The present invention is not limited particularly to the above described embodiment. Various modifications can be made without deviating from the scope of the present invention.

Embodiment Example 1

A carbon paper having a bulk density of 0.34 g/m$^2$ and a thickness of 150 μm was impregnated with a dispersion liquid of a tetrafluoroethylene-hexafluoropropylene copolymer (FEP), "FEP120JRB" (trade name) available from Du Pont-Mitsui Fluorochemicals Co., Ltd., and the resultant paper was dried at 120° C. for 30 minutes. Further, the paper was heat-treated at 380° C. to produce a first gas diffusion layer 22.

In the meanwhile, 20 g of a vapor-grown carbon fiber VGCF available from Showa Denko K.K., 5 g of FEP120JRB, and 200 g of ethylene glycol were stirred and mixed using a ball mill to prepare a paste for forming a first porous layer. Further, the first porous layer paste was applied by a coater onto the first gas diffusion layer 22, and heat-treated at 380° C. for 30 minutes, to thereby form the first porous layer 24. That is, the first stack body 26 comprising the first gas diffusion layer 22 and the first porous layer 24 was obtained. The dry weight per unit area of the first porous layer 24 (unit weight) was 1.4 mg/cm$^2$.

Separately from the above, a carbon paper having a bulk density of 0.34 g/m$^2$ and a thickness of 150 μm was impregnated with FEP120JRB, and the resultant paper was dried at 120° C. for 30 minutes to produce the second gas diffusion layer 30.

Further, 12 g of VGCF, 12 g of FEP120JRB, and 200 g of ethylene glycol were stirred and mixed using a ball mill to prepare a paste for forming a second porous layer. The second porous layer paste was applied by a coater to the second gas diffusion layer 30, and heat-treated at 380° C. for 30 minutes to thereby form the second porous layer 34. That is, the second stack body 36 comprising the second gas diffusion layer 30 and the second porous layer 34 was obtained. The dry weight per unit area of the second porous layer 34 was 1.3 mg/cm$^2$.

At this time, the pore diameter distribution of each of the first stack body 26 and the second stack body 36 was measured by a mercury porosimetry. On a region where the pore diameter is smaller than the reference pore diameter, the pore diameter distribution curve of the first stack body 26 and the pore diameter distribution curve of the second stack body 36 coincide with each other for the most part. That is, at the same pore diameter, the first stack body 26 and the second stack body 36 had substantially the same pore volume (pore diameter distribution). On a region where the pore diameter is larger than the reference pore diameter, the total pore volumes of the first stack body 26 and the second stack body 36 were 4.4 μL/cm$^2$, and 4.9 μL/cm$^2$, respectively. The pore volume ratio calculated according to the equation (1) was 1.11.

Separately from this process, 5.0 g of carbon black, 23.36 g of 2% Nafion DE2020CS (trade name) solution, which is an ion-conductive polymer solution available from Du Pont, and 2.53 g of VGCF were mixed and stirred to prepare a paste for a hydrophilic layer. This hydrophilic layer paste was applied by a coater onto the second porous layer 34, and kept at 120° C. for 30 minutes for drying to thereby form the hydrophilic layer 32. That is, the hydrophilic layer 32 was stacked on the second porous layer 34 of the second stack body 36. The dry weight per unit area of the hydrophilic layer 32 was 0.2 mg/cm$^2$.

A platinum catalyst LSA available from BASF was added to ion-conductive polymer solution Nafion DE2020CS such that the ratio of Nafion DE2020CS to the LSA (Nafion DE2020CS/LSA) was 0.1. The solution was stirred and mixed using a ball mill to prepare a catalyst layer paste for forming a catalyst layer. The catalyst layer paste was applied onto a single PTFE sheet at the platinum density of 0.4 mg/cm$^2$. The sheet with the paste applied thereon was heat-treated at 120° C. for 60 minutes to thereby obtain a sheet for transferring the first electrode catalyst layer 20 to one surface of the electrolyte membrane 14.

In the meanwhile, the catalyst layer paste was applied onto another PTFE sheet at the platinum density of 0.7 mg/cm². The sheet with the applied paste was heat-treated at 120° C. for 60 minutes to thereby obtain a sheet for transferring the second electrode catalyst layer 28 to the other surface of the electrolyte membrane 14.

The first electrode catalyst layer 20 and the second electrode catalyst layer 28 of these two sheets were thermally compression-bonded to both surfaces of an electrolyte membrane 14 having a thickness of 20 μm, comprising GORE-SELECT available from W.L. Gore & Associates, Co., Ltd., and the PTFE sheets were peeled off. Thus, by using a decal method, the first electrode catalyst layer 20 was transferred to one surface of the electrolyte membrane 14, and the second electrode catalyst layer 28 was transferred to the other surface of the electrolyte membrane 14.

Next, the first porous layer 24 of the first stack body 26 was stacked on the first electrode catalyst layer 20, and the second stack body 36 was stacked on the second electrode catalyst layer 28 through the hydrophilic layer 32. In this state, these components were thermally compression-bonded at 120° C. under a surface pressure of 30 kgf/cm². In the above processes, the membrane electrode assembly 12 was prepared.

Then, the membrane electrode assembly 12 was sandwiched between the anode side separator 40 and the cathode side separator 42 (both of the anode side separator 40 and the cathode side separator 42 were made of metal) to obtain the fuel cell comprising the unit cell 10, which will be referred to as Embodiment Example 1.

Embodiment Examples 2 to 4

The unit cell 10 was produced in the same manner as in the case of Embodiment Example 1 except that the dry weight per unit area of the second porous layer 34 was 1.4 mg/cm² in Embodiment Example 2, 1.6 mg/cm² in Embodiment Example 3, and 1.9 mg/cm² in Embodiment Example 4.

Comparative Examples 1 and 2

The unit cell was produced in the same manner as in the case of Embodiment Example 1 except that the dry weight per unit area of the second porous layer 34 was 1.0 mg/cm² in Comparative Example 1, and 2.0 mg/cm² in Comparative Example 2.

Comparative Example 3

The unit cell was produced in the same manner as in the case of Embodiment Example 3 except that the hydrophilic layer 32 was not formed, in Comparative Example 3.

Table 1 shows the dry weight (unit weight) of the first gas diffusion layer 22, the dry weight (unit weight) of the second gas diffusion layer 30, the total pore volume of the first stack body 26, the total pore volume of the second stack body 36, the pore volume ratio, and the presence/absence of the hydrophilic layer 32 in each of Embodiment Examples 1 to 4 and Comparative Examples 1 to 3. For ease of understanding, Examples are listed in the table 1 in order of increasing the value of the pore volume ratio, except Comparative Example 3.

TABLE 1

| No. | DRY WEIGHT OF FIRST GAS DIFFUSION LAYER (UNIT WEIGHT) [mg/cm²] | DRY WEIGHT OF SECOND GAS DIFFUSION LAYER (UNIT WEIGHT) [mg/cm²] | TOTAL PORE VOLUME OF FIRST STACK BODY [μL/cm²] | TOTAL PORE VOLUME OF SECOND STACK BODY [μL/cm²] | PORE VOLUME RATIO [ANODE/ CATHODE] | PRESENCE/ ABSENCE OF HYDROPHILIC LAYER | TERMINAL VOLTAGE [V] 60° C. | 85° C. |
|---|---|---|---|---|---|---|---|---|
| COMPARATIVE EXAMPLE 1 | 1.4 | 1.0 | 4.4 | 3.9 | 0.89 | PRESENCE | 0.599 | 0.621 |
| EMBODIMENT EXAMPLE 1 | 1.4 | 1.3 | 4.4 | 4.9 | 1.11 | PRESENCE | 0.617 | 0.616 |
| EMBODIMENT EXAMPLE 2 | 1.4 | 1.4 | 4.4 | 5.1 | 1.16 | PRESENCE | 0.628 | 0.625 |
| EMBODIMENT EXAMPLE 3 | 1.4 | 1.6 | 4.4 | 5.9 | 1.34 | PRESENCE | 0.631 | 0.623 |
| EMBODIMENT EXAMPLE 4 | 1.4 | 1.9 | 4.4 | 6.8 | 1.55 | PRESENCE | 0.645 | 0.621 |
| COMPARATIVE EXAMPLE 2 | 1.4 | 2.0 | 4.4 | 7.2 | 1.64 | PRESENCE | 0.646 | 0.603 |
| COMPARATIVE EXAMPLE 3 | 1.4 | 1.6 | 4.4 | 5.9 | 1.34 | ABSENCE | 0.632 | 0.608 |

In each of the unit cells 10 of Embodiment Examples 1 to 4 and the unit cells of Comparative Examples 1 to 3, hydrogen gas was supplied to flow through the fuel gas flow field 44 of the anode side separator 40, and compressed air was supplied to flow through the oxygen-containing gas flow field 46 of the cathode side separator 42 to generate electricity. The temperature of the unit cell was 60° C. or 85° C. The relative humidity of the hydrogen gas and the relative humidity of the compressed air were 50% and 73%, respectively. The stoichiometric ratios at the anode 16 and the cathode 18 were 1.4, 1.8, respectively. The current density was 1.5 A/cm². The relative humidity of the compressed air, and the current density have larger values in comparison of those of the normal operating condition of the solid polymer electrolyte fuel cell.

Figure 3:
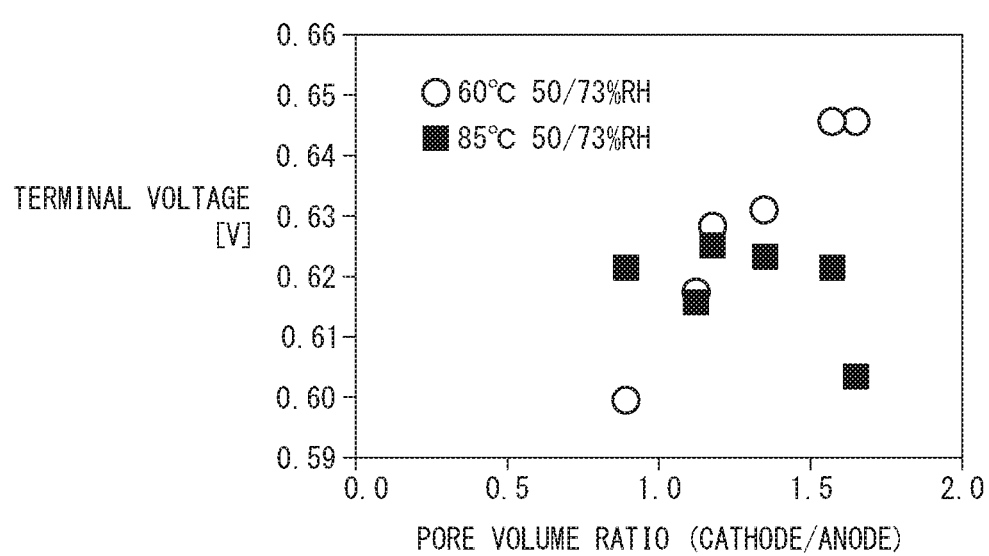
FIG. 3 is a graph showing the relationship between the pore volume ratio and the terminal voltage of a unit cell in each of embodiment examples 1 to 4, and comparative examples 1 and 2.

The results are also shown in Table 1. Further, FIG. 3 shows the relationship between the pore volume ratio and the terminal voltage in each of Embodiment Examples 1 to 4 and Comparative Examples 1 and 2. In FIG. 3, white circle symbols show plots of the terminal voltage at 60° C., and the black square symbols show plots of the terminal voltage at 85° C. Further, "RH" stands for the relative humidity. As can be seen from Table 1 and FIG. 3, when the pore volume ratio is in the range of 1.10 to 1.60, and the hydrophilic layer 32 is provided on the cathode 18 side, it is possible to obtain sufficiently large terminal voltage at low temperature and high humidity, and also at high temperature and high humidity. For this reason, it is clear that a suitable balance between the water drainage capability and the water retention capability at the anode 16 and the cathode 18 was achieved.

In particular, even though the compressed air at high humidity is supplied to the cathode 18, and water production occurs with progression of the electrode reaction, the sufficient terminal voltage was obtained in Embodiment Examples 1 to 4. This means that a suitable balance between the water drainage capability and the water retention capability was achieved at the cathode 18.

What is claimed is:

1. A membrane electrode assembly including an anode, a cathode, and an electrolyte membrane interposed between the anode and the cathode, the electrolyte membrane comprising a solid polymer membrane,
    wherein the anode includes a first electrode catalyst layer facing the electrolyte membrane, a first gas diffusion layer configured to allow a fuel gas to flow through the first gas diffusion layer, and a first porous layer interposed between the first electrode catalyst layer and the first gas diffusion layer;
    the cathode at least includes a second electrode catalyst layer facing the electrolyte membrane, a second gas diffusion layer configured to allow an oxygen-containing gas to flow through the second gas diffusion layer, and a second porous layer interposed between the second electrode catalyst layer and the second gas diffusion layer;
    when pore diameter distribution of a first stack body comprising the first gas diffusion layer and the first porous layer stacked together is compared with pore diameter distribution of a second stack body comprising the second gas diffusion layer and the second porous layer stacked together, on a region where a pore diameter is smaller than a reference pore diameter at which a pore volume is maximum, the pore diameter distribution of the first stack body and the pore diameter distribution of the second stack body are substantially same, and on a region where the pore diameter is larger than the reference pore diameter, the pore volume of the second stack body is greater than the pore volume of the first stack body at same pore diameter; and
    a pore volume ratio represented by the following equation (1) is in a range of 1.10 to 1.60:

the pore volume ratio=total volume of pores having the pore diameter not less than the reference pore diameter, of the second stack body/total volume of pores having the pore diameter not less than the reference pore diameter, of the first stack body  (1).

2. The membrane electrode assembly according to claim 1, wherein the reference pore diameter is in a range of 0.7 to 1 μm.

3. The membrane electrode assembly according to claim 1, wherein a thickness of the first porous layer is equal to or greater than a thickness of the second porous layer.

4. The membrane electrode assembly according to claim 1, wherein the cathode further includes a hydrophilic layer interposed between the second porous layer and the second electrode catalyst layer.

5. The membrane electrode assembly according to claim 4, wherein the hydrophilic layer contains ionomer.

6. The membrane electrode assembly according to claim 1, wherein the first porous layer and the second porous layer contain vapor-grown carbon fiber.

7. The membrane electrode assembly according to claim 1, wherein on the region where the pore diameter is smaller than the reference pore diameter, a difference between the pore volume of the first stack body and the pore volume of the second stack body is equal to or less than 0.5 μL/cm$^2$.

8. The membrane electrode assembly according to claim 7, wherein on the region where the pore diameter is smaller than the reference pore diameter, the difference between the pore volume of the first stack body and the pore volume of the second stack body is equal to or less than 0.3 μL/cm$^2$.

* * * * *